United States Patent
Gorecha et al.

(10) Patent No.: US 11,204,781 B2
(45) Date of Patent: Dec. 21, 2021

(54) OPTIMIZING POWER, MEMORY AND LOAD TIME OF A COMPUTING SYSTEM DURING IMAGE LOADING BASED ON IMAGE SEGMENTATION

(71) Applicant: QUALCOMM Incorporated, San Diego, CA (US)

(72) Inventors: Saurabh Gorecha, Hyderabad (IN); Naresh Kumar Sharma, Hyderabad (IN); Pravin Kumar, Faridabad (IN)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 16/710,395

(22) Filed: Dec. 11, 2019

(65) Prior Publication Data

US 2021/0182081 A1 Jun. 17, 2021

(51) Int. Cl.
   *G06F 9/445* (2018.01)
   *G06F 15/78* (2006.01)
   *G06F 9/50* (2006.01)
   *G06F 9/4401* (2018.01)

(52) U.S. Cl.
   CPC ........ *G06F 9/44505* (2013.01); *G06F 9/4411* (2013.01); *G06F 9/5016* (2013.01); *G06F 15/7807* (2013.01)

(58) Field of Classification Search
   CPC .. G06F 9/44505; G06F 9/4411; G06F 9/5016; G06F 9/441; G06F 9/44; G06F 9/445; G06F 15/7807; G06F 9/4408; G06F 9/4016
   See application file for complete search history.

(56) References Cited

U.S. PATENT DOCUMENTS

| | | | |
|---|---|---|---|
| 7,461,244 B2 * | 12/2008 | Chen | G06F 9/4401 713/1 |
| 9,230,112 B1 * | 1/2016 | Peterson | G06F 9/4406 |
| 9,411,688 B1 * | 8/2016 | Poolla | H03K 19/17764 |
| 2011/0307711 A1 * | 12/2011 | Novak | G06F 21/575 713/188 |
| 2013/0268746 A1 * | 10/2013 | Hsu | G06F 9/4401 713/2 |
| 2017/0185781 A1 * | 6/2017 | Kim | G09C 1/00 |
| 2018/0189495 A1 * | 7/2018 | Kim | G06F 21/575 |
| 2019/0018669 A1 * | 1/2019 | Cook | G06F 16/2365 |

* cited by examiner

*Primary Examiner* — Raymond N Phan
(74) *Attorney, Agent, or Firm* — Patterson & Sheridan, L.L.P

(57) ABSTRACT

A method of loading an executable image for a computing system includes identifying segments of at least one executable image available for loading into memory of the computing system. Each segment is associated with one or more configuration features for the computing system. At least a first segment of the at least one executable image to load into the memory of the computing system is determined, based on the first segment satisfying one or more conditions associated with the computing system. The first segment of the executable image is loaded into the memory of the computing system. At least a second segment of the at least one executable image is made available for memory re-allocation, based on the second segment not satisfying the one or more conditions associated with the computing system. Various additional and alternative aspects are described herein.

20 Claims, 9 Drawing Sheets

| BIT7 | BIT6 | BIT5 | BIT4 | BIT3 | BIT2 | BIT1 | BIT0 |
|---|---|---|---|---|---|---|---|
| 1 | 1 | 1 | 0 | 0 | 1 | 0 | 1 |

0 Enable
1 Disable

| | | |
|---|---|---|
| Feature #1 = {"FEATURE1"} | elf1 | BIT1 |
| Feature #2 = {"FEATURE2"} | elf2 | BIT3 |
| Feature #3 = {"FEATURE3"} | elf1 | BIT4 |
| Feature #4 = {"FEATURE4"} | elf3 | BIT2 |
| Feature #5 = {"FEATURE5"} | elf4 | BIT6 |
| Feature #6 = {"FEATURE6"} | elf4 | BIT5 |
| Feature #7 = {"FEATURE7"} | elf5 | BIT0 |
| Feature #8 = {"FEATURE8"} | elf6 | BIT7 |

| | |
|---|---|
| 0x10000 | .txt_common |
| 0x20000 | .txt_feature1 |
| 0x30000 | .txt_feature2 |
| | ... |
| | .txt_feature_n |
| | |
| 0xA0000 | .data_common |
| 0xB0000 | .data_feature1 |
| 0xC0000 | .data_feature2 |
| | ... |
| | .data_feature_n |

FIG. 6

OPTIMIZING POWER, MEMORY AND LOAD TIME OF A COMPUTING SYSTEM DURING IMAGE LOADING BASED ON IMAGE SEGMENTATION

TECHNICAL FIELD

The teachings of the present disclosure relate generally to system-on-chip (SoC) integrated circuit design, and in certain aspects, to systems, apparatuses, and methods for performance optimization, based on image segmentation, e.g., during image loading.

INTRODUCTION

Computing devices are ubiquitous. Some computing devices are portable such as mobile phones, tablets, and laptop computers. As the functionality of such portable computing devices increases, the computing or processing power required and generally the data storage capacity to support such functionality also increases. In addition to the primary function of these devices, many include elements that support peripheral functions. For example, a cellular telephone may include the primary function of enabling and supporting cellular telephone calls and the peripheral functions of a still camera, a video camera, global positioning system (GPS) navigation, web browsing, sending and receiving emails, sending and receiving text messages, push-to-talk capabilities, etc. Many of these portable devices include a SoC to enable one or more primary and peripheral functions on the specific device.

A SoC generally includes multiple central processing unit (CPU) cores embedded in an integrated circuit or chip and coupled to a local bus. The CPU cores may further be arranged into one or more computing clusters. The SoC may further generally include hardware components and other processors.

The SoC, like larger computing devices such as desktop and server computers relies on a boot sequence or a boot code upon powering up. The boot sequence is the initial set of operations that the SoC performs when power is first applied to the SoC. The boot code enables a (e.g., bootstrapping) process that initializes the SoC. The boot code is typically stored in a read-only memory (ROM) for quick access, low complexity, spatial efficiency, low cost, and security reasons.

The boot sequence may utilize internal memory (e.g., on-chip memory that is on the same chip as the SoC, such as static random-access memory (SRAM)) and complex drivers to securely boot the SoC, as well as external memory (e.g., off-chip memory that is off the same chip as the SoC, including dynamic random access memory (DRAM), such as double data rate (DDR) synchronous DRAM (SDRAM), low power DDR (LPDDR), etc.) such as to save costs on the amount of internal memory used when the SoC has more functionality that requires more memory to boot. The external memory may be stacked with the SoC (e.g., application processor, modem chip, etc.), may be configured as a package on package design, may be completely external (e.g., not on the same package as the SoC), etc.

As part of the boot sequence, to boot each of or group of the hardware components and other processors of the SoC, there may be a chain of bootloaders and handoff secure executables (e.g., firmware executables also referred to as firmware images, executable images, etc.). In general, each of the hardware components and other processors of the SoC may need to be booted (e.g., securely booted) using a firmware image of that hardware component. A chain loading method may be used to boot the various hardware components of the SoC by executing each of the firmware images. The greater the number of hardware components on the SoC, the greater the number of firmware images for the SoC that need to be executed. Thus, the boot time of the SoC (e.g., for secure and non-secure boot of components) is a function of the number of firmware images.

Additionally, the boot time of the SoC can be significantly affected by the number of features associated with a given firmware image. For example, for subsystems on complex chipsets, the firmware image generally includes a large set of features. In conventional image loading techniques, the application processor generally loads the complete firmware image, including the entire set of features, in memory. Once the complete image is loaded in memory, the subsystem (associated with that image) can be brought out of reset. However, in many situations, a user (e.g., original equipment manufacturer (OEM)) may have a subset of the available image features enabled, e.g., based on the licenses purchased by the user, based on a product requirement, product capabilities, etc. Consequently, loading the complete firmware image in these situations can lead to increased memory consumption, increased power consumption, and increased SoC boot up time, significantly impacting performance of the SoC.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides a computer-implemented method of loading an executable image for a computing system. The method includes identifying a plurality of segments of at least one executable image available for loading into memory of the computing system. Each segment is associated with one or more configuration features for the computing system. The method also includes determining a first one or more of the plurality of segments of the at least one executable image to load into the memory of the computing system, based on the first one or more plurality of segments satisfying one or more conditions associated with the computing system. The method further includes loading the first one or more of the plurality of segments of the executable image into the memory of the computing system.

In some aspects, the present disclosure provides a SoC. The SoC comprises an interface to a memory and at least one processor coupled to the memory. The at least one processor is configured to identify a plurality of segments of at least one executable image available for loading into the memory of the SoC. Each segment is associated with one or more configuration features for the SoC. The at least one processor is also configured to determine a first one or more of the plurality of segments of the at least one executable image to load into the memory of the SoC, based on the first one or more plurality of segments satisfying one or more conditions associated with the SoC. The at least one processor is further configured to load the first one or more of the plurality of segments of the executable image into the memory of the SoC.

In some aspects, the present disclosure provides a SoC. The SoC includes means for identifying a plurality of segments of at least one executable image available for loading into memory of the SoC. Each segment is associated with one or more configuration features for the SoC. The SoC also includes means for determining a first one or more of the plurality of segments of the at least one executable image to load into the memory of the SoC, based on the first one or more plurality of segments satisfying one or more conditions associated with the SoC. The SoC further includes means for loading the first one or more of the plurality of segments of the executable image into the memory of the SoC.

In some aspects, the present disclosure provides a non-transitory computer readable medium having instructions stored thereon that when executed by a processor cause the processor to perform a method of loading an executable image for a computing system. The method includes identifying a plurality of segments of at least one executable image available for loading into memory of the computing system. Each segment is associated with one or more configuration features for the computing system. The method also includes determining a first one or more of the plurality of segments of the at least one executable image to load into the memory of the computing system, based on the first one or more plurality of segments satisfying one or more conditions associated with the computing system. The method further includes loading the first one or more of the plurality of segments of the executable image into the memory of the computing system.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 5 illustrates an example feature fuse map for a firmware image, in accordance with certain aspects of the present disclosure.

FIG. 6 illustrates an example memory map for a firmware image, in accordance with certain aspects of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Although the teachings of this disclosure are illustrated in terms of integrated circuits (e.g., a SoC), the teachings are applicable in other areas. The teachings disclosed should not be construed to be limited to SoC designs or the illustrated embodiments. The illustrated embodiments are merely vehicles to describe and illustrate examples of the inventive teachings disclosed herein. Further, though certain firmware image loading techniques are described with respect to certain hardware components or processors, similar techniques may be used for loading firmware images of other components that are booted (e.g., by a SoC).

Figure 1:
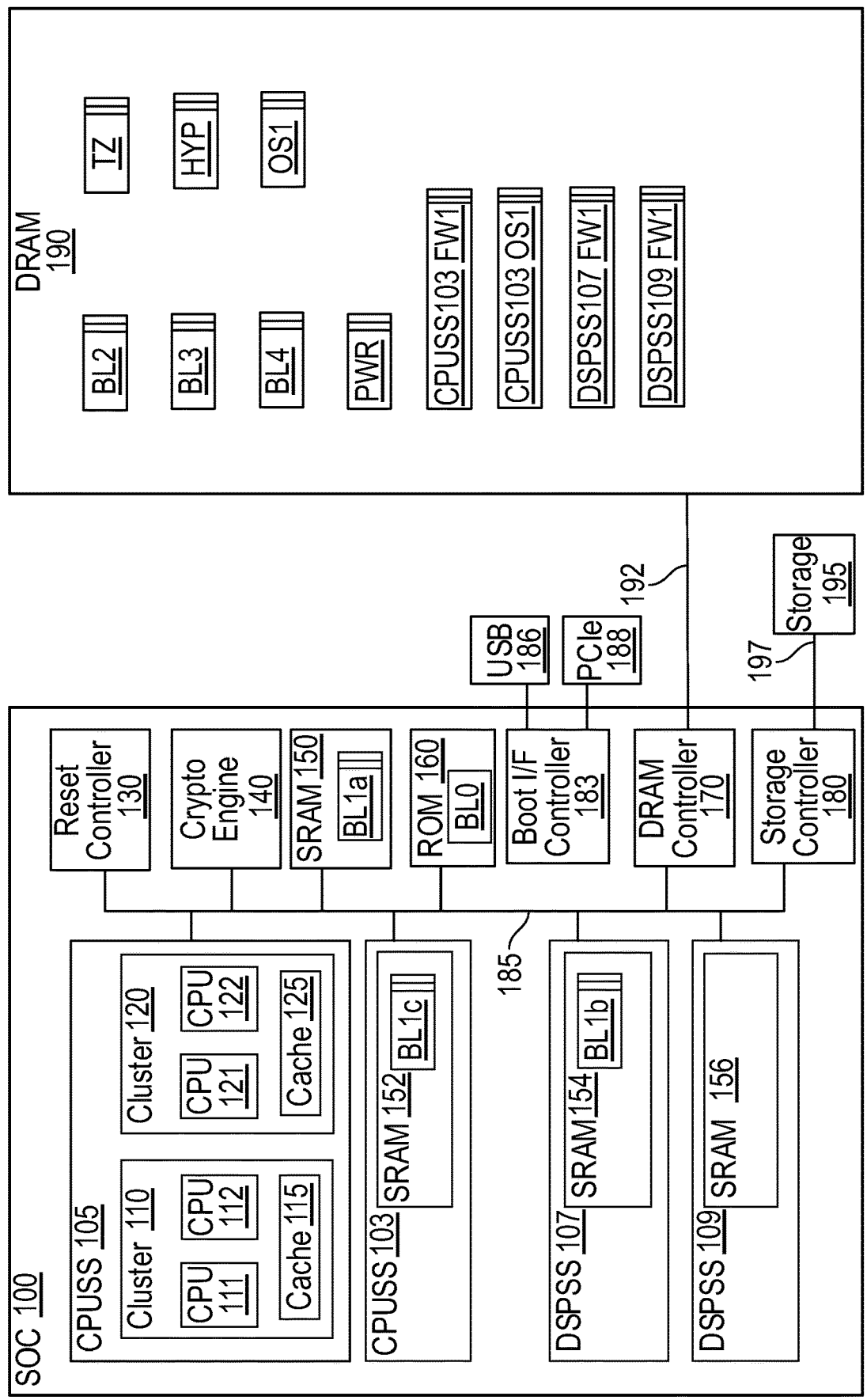
FIG. 1 is an illustration of an exemplary system-on-chip (SoC), in accordance with certain aspects of the present disclosure.

FIG. 1 is an illustration of an exemplary SoC 100, in accordance with certain aspects of the present disclosure. The SoC 100 may be interconnected to other chips by one or more chip-to-chip interfaces such as peripheral component interconnect express (PCIe), universal serial bus (USB), serial peripheral interface (SPI), etc. In certain aspects, one of the one or more chip-to-chip interfaces may be used for boot.

As shown, the SoC 100 includes a CPU sub-system (CPUSS) 105. The CPUSS 105 includes a plurality of CPU cores 111, 112, 121, and 122. Though CPUSS 105 is shown with a particular number of CPU cores, it should be noted that there may be additional or fewer cores in CPUSS 105. Further, CPU cores 111 and 112 are part of a cluster 110, and CPU cores 121 and 122 are part of a cluster 120. Again, though shown with a particular number of CPU clusters, CPUSS 105 may include additional or fewer clusters. Further, each cluster may include the same or a different number of CPU cores. The CPU cores 111, 112, 121, and 122 may be of the same type, or may be of different types (e.g., ARM design, non-ARM design, etc.). Further, the CPU cores of a given cluster (e.g., CPU cluster 110 or 120) may be of the same type, or may be of different types (e.g., in-cluster big.LITTLE design, cluster based big.LITTLE design, etc.).

Further, the CPUSS 105 may include CPU resources, such as one or more caches. As shown, each cluster 110 and 120 includes a cache 115 and 125, respectively. In certain aspects, the CPU cores of the clusters 110 and 120 may share the cache 115 and 125, respectively, for memory storage. It should be noted that the CPUSS 105 may include additional or different CPU resources than those shown. For example, in some aspects, one or more CPU cores may have its own associated cache, one or more clusters may have its own associated cache (e.g., shared by CPU cores of the cluster), and/or the CPUSS 105 may include one or more caches shared by one or more clusters and/or CPU cores. The SoC 100 further may include additional CPUSS 103, and one or more additional digital signal processor sub-systems (DSPSS). In certain aspects, each of CPUSS 103, DSPSS 107, and DSPSS 109 may have its own SRAM 152, 154, and 156, respectively, for reading and writing data.

The SoC 100 further includes a reset controller 130, a cryptographic (crypto) engine (or component) 140, static random-access memory (SRAM) 150, a read only memory (ROM) 160, a dynamic RAM (DRAM) controller 170, a storage (e.g., flash) controller 180, and a boot interface (I/F) controller 183, which are all shown as internal (e.g., on-chip) components of the SoC 100. The internal components of the SoC 100 are coupled together by a bus 185. Further, the DRAM controller 170 is coupled to a DRAM 190 external (e.g., off-chip) from the SoC 100 by a bus 192. The DRAM 190 may be stacked with the SoC 100, may be configured as a package on package design, may be completely external (e.g., not on the same package as the SoC 100), etc. The storage (e.g., flash) controller 180 is coupled to a storage 195 (e.g., flash storage) external (e.g., off-chip) from the SoC 100 by a bus 197. The SRAM 150, DRAM 190, and storage 195 may provide storage capacity for the SoC 100.

In some aspects, the reset controller 130, during system boot, is configured to release a CPU core for the CPUSS 105 from reset. In some aspects, the CPU core released is then configured to execute code/data (e.g., boot code), such as ROM bootloader BL0 as shown, from the ROM 160 to boot the SoC 100 (e.g., to run a high level operating system (OS)). The ROM 160 (e.g., boot ROM) is an integrated circuit that includes the code or codes (e.g., boot code) that are executed by the CPUSS 105 during an initial power-on or upon a watchdog reset condition. In some aspects, the ROM is enabled in firmware. In some aspects, the CPUSS 105 boots (e.g., securely) from storage 195, by running firmware images stored in storage 195 for booting the SoC 100, including the various hardware components of the SoC 100. Further, though certain aspects are described with respect to the SoC 100 booting from storage 195, the SoC 100 may similarly boot (e.g., securely) from a transport layer instead of a storage (e.g., a flashless transport layer). For example, the CPUSS 105 may boot from the transport layer, by running firmware images received over the transport layer for booting the SoC 100. In particular, SoC 100 may utilize boot I/F controller 183 to communicate with another component (e.g., another SoC) over a chip-to-chip interface. For example, boot I/F controller 183 of SoC 100 may control a chip-to-chip interface (e.g., transport layer) of SoC 100 such as PCIe 188 or USB 186 to communicate with a chip-to-chip interface of another component. Accordingly, SoC 100 may communicate over a transport layer via boot I/F controller 183.

In certain aspects, the CPUSS 105 is configured to boot by running firmware images shown as loaded in DRAM 190, SRAM 150, SRAM 152, SRAM 154, and SRAM 156. For example, the CPUSS 105 executes ROM bootloader BL0 from ROM 160. The ROM bootloader BL0 causes the CPUSS 105 to execute bootloader BL1$a$ in SRAM 150, which initializes DRAM controller 170 and DRAM 190, and/or Boot I/F controller 183. In certain aspects, ROM bootloader BL0 initializes Boot I/F controller 183 instead of bootloader BL1$a$, such as in a flashless boot configuration. Accordingly, the SoC 100 can access firmware images from DRAM 190 and/or over a chip-to-chip interface. BL1$a$ may further boot the SoC 100 by controlling execution of additional firmware images, such as bootloaders BL2, BL3, and BL4, TZ (e.g., secure world firmware), HYP (e.g., hypervisor firmware), and OS1 (e.g., operating system) on the application processor (e.g., CPUSS 105) subsystem. Further, in certain aspects, other subsystem firmware images booted during the boot process include PWR (e.g., power firmware), CPUSS103 FW1 (e.g., CPUSS 103 firmware), CPUSS103 OS1 (e.g., CPUSS 103 operating system), DSPSS107 FW1 (e.g., DSPSS 107 firmware), and DSPSS109 FW1 (e.g., DSPSS 109 firmware). In certain aspects, certain early firmware images are booted by BL1$a$, and the remaining firmware images are booted by an operating system such as OS1.

Figure 2:
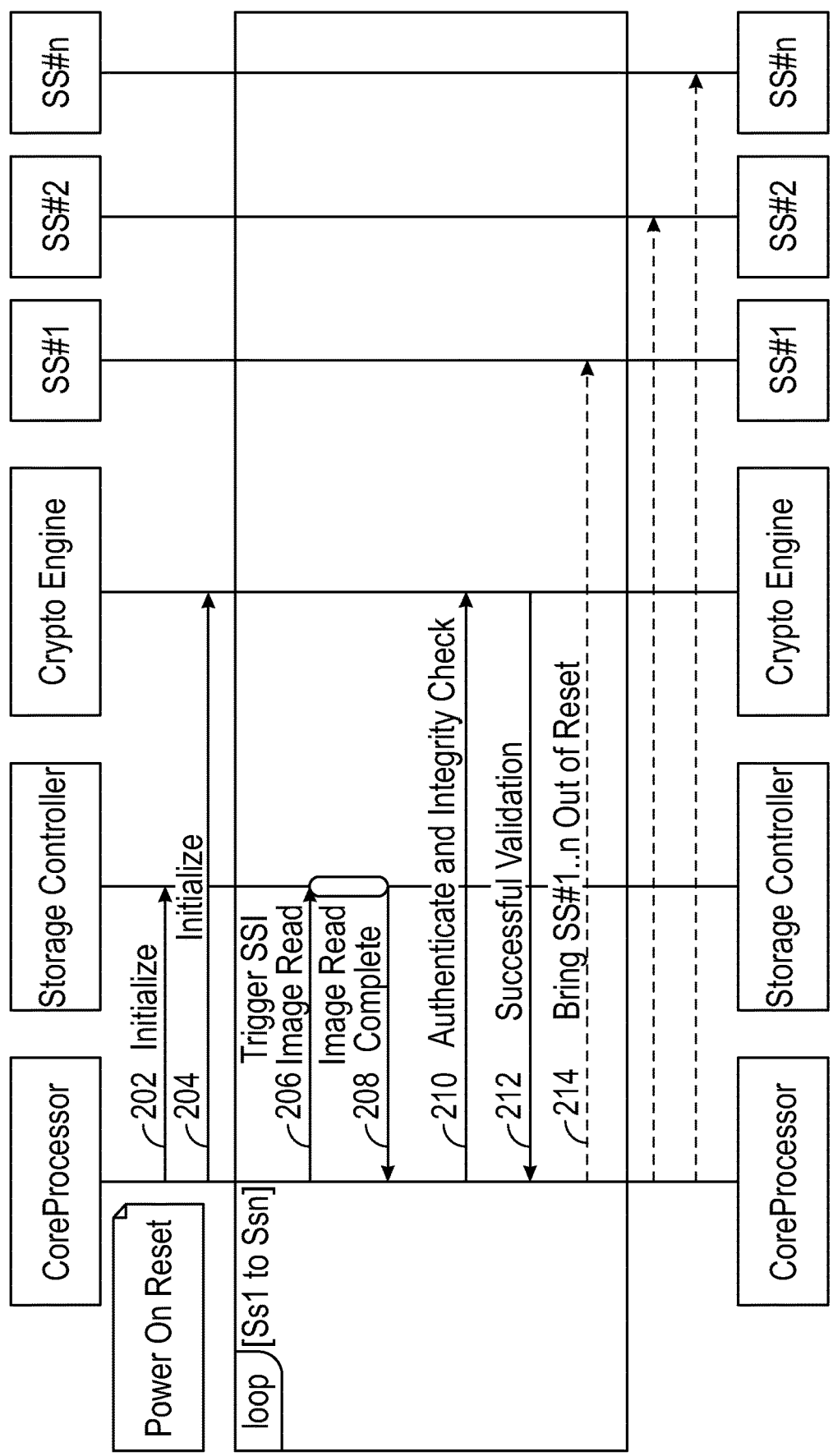
FIG. 2 illustrates an example boot flow for bringing a system out of reset.

CPUSS 105 generally loads a firmware image into memory, segment by segment, in a sequential manner. For example, the firmware image may include multiple segments, and each segment may include (or be associated with) one or more features (also referred to herein as configuration settings or subsystem capabilities). FIG. 2 shows a reference example of a standard boot flow that is typically used by application processors (e.g., CPUS S 105) to bring a system out of reset. Here, after initializing a set of peripheral components (e.g., storage controller 180 and crypto engine 140) at 202 and 204, the application processor performs a block based image loading and authentication procedure for each subsystem of a computing system (e.g., SoC 100). The storage controller 180 can be used for reading a firmware image from secondary storage (e.g., storage 195) and the crypto engine 140 can be used to authenticate the firmware image read from secondary storage.

As shown, as part of the image loading and authentication procedure, the application processor triggers an image read of subsystem (SS) firmware image i, where i is a set of integers from 1 to n, and n is the number of SSs (206). In particular, at 206, the application processor can trigger a read of the SS firmware image i from secondary storage (e.g., storage 195), e.g., using storage controller(s) 180. Once the application processor receives an indication at 208 that the firmware image i has been read from secondary storage, the application processor triggers the crypto engine 140 to perform an authentication and integrity check of the firmware image i (210). Once the crypto engine 140 successfully authenticates and completes the integrity check of the firmware image i (212), the application processor brings the $SS_i$ out of reset (214). The application processor may repeat steps 206, 208, 210, 212, and 214 for each subsystem (e.g., $SS_i$ to $SS_n$) of a computing system, e.g., in order to bring each subsystem out of reset.

Figure 3:
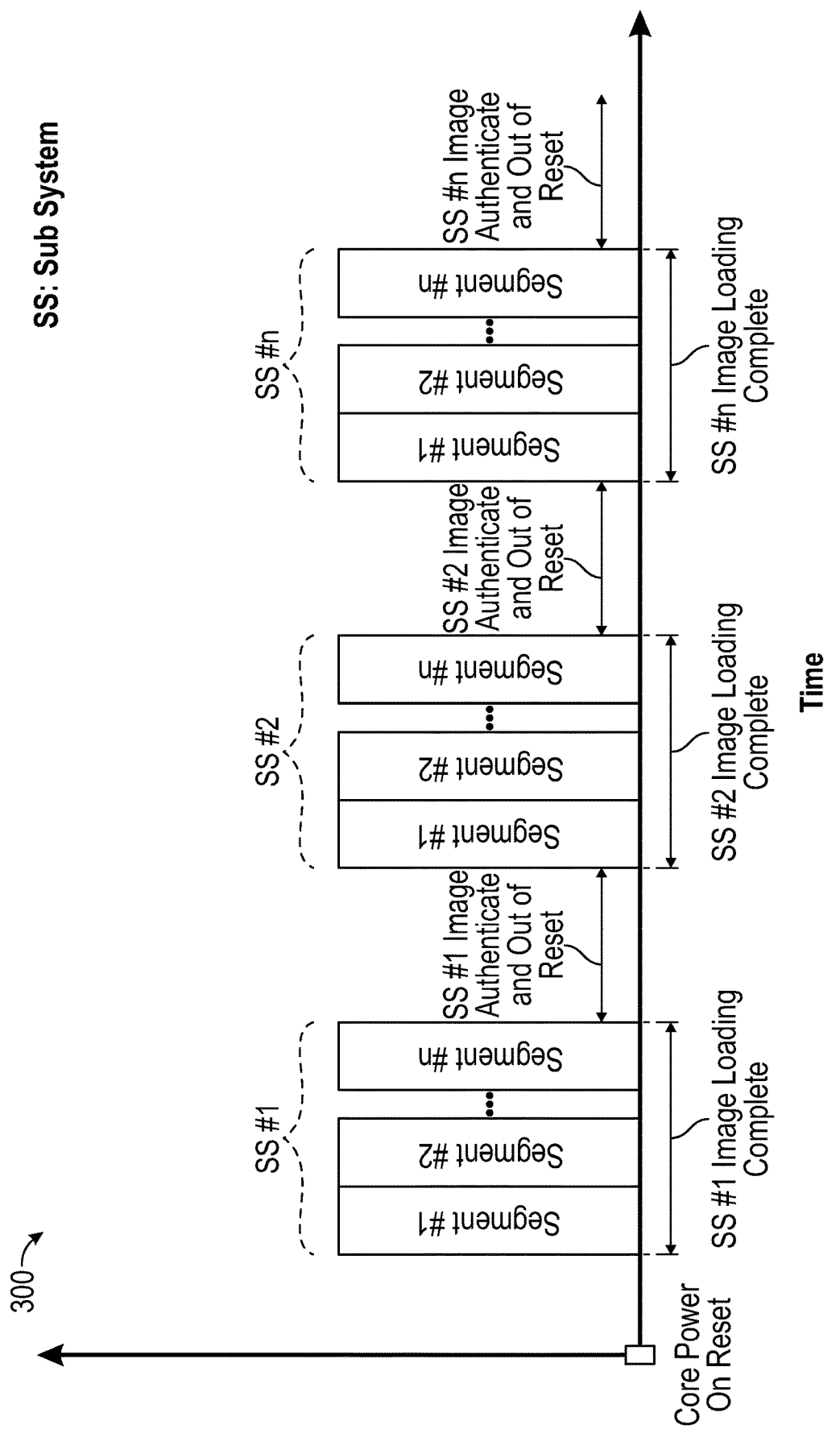
FIG. 3 depicts an example timeline for bringing a system out of reset using a standard boot flow.

The boot flow described in FIG. 2 can significantly increase the amount of time associated with bringing a computing system out of reset. As shown in FIG. 3, for example, the total amount of time associated with bringing a computing system out of reset is approximately equal to the amount of time it takes to load all segments of firmware images (segments j to m) within each SS (SSi to SSn). In one aspect, the total amount of time may be approximately equal to $\Sigma_{i=0}^{n} E_{j=0}^{m}(SS_{ij})t$.

Aspects presented herein provide techniques for reducing the amount of time associated with bringing a computing system out of reset. More specifically, aspects provide techniques for improving a set of system key performance indicators (KPI) metrics (e.g., memory usage, power consumption, boot time, etc.) based on segmentation of the image layout, where each image segment contains a particular set of features.

In aspects herein, the features of a given firmware image may be categorized in one or more subsystem segments during a design or compile phase of source code. In one aspect, for example, a feature fuse map that specifies which features of a firmware image are associated with a given segment of the subsystem may be defined/pre-configured during the design/compile phase. As described below, aspects may perform segment loading based on the feature fuse map and segment information (e.g., segment name, segment length, start address, etc.), which enables the application processor to load specific features of a firmware image (e.g., the features of the given image that the application processor is allowed to use), as opposed to loading all features of the image.

Figure 4:
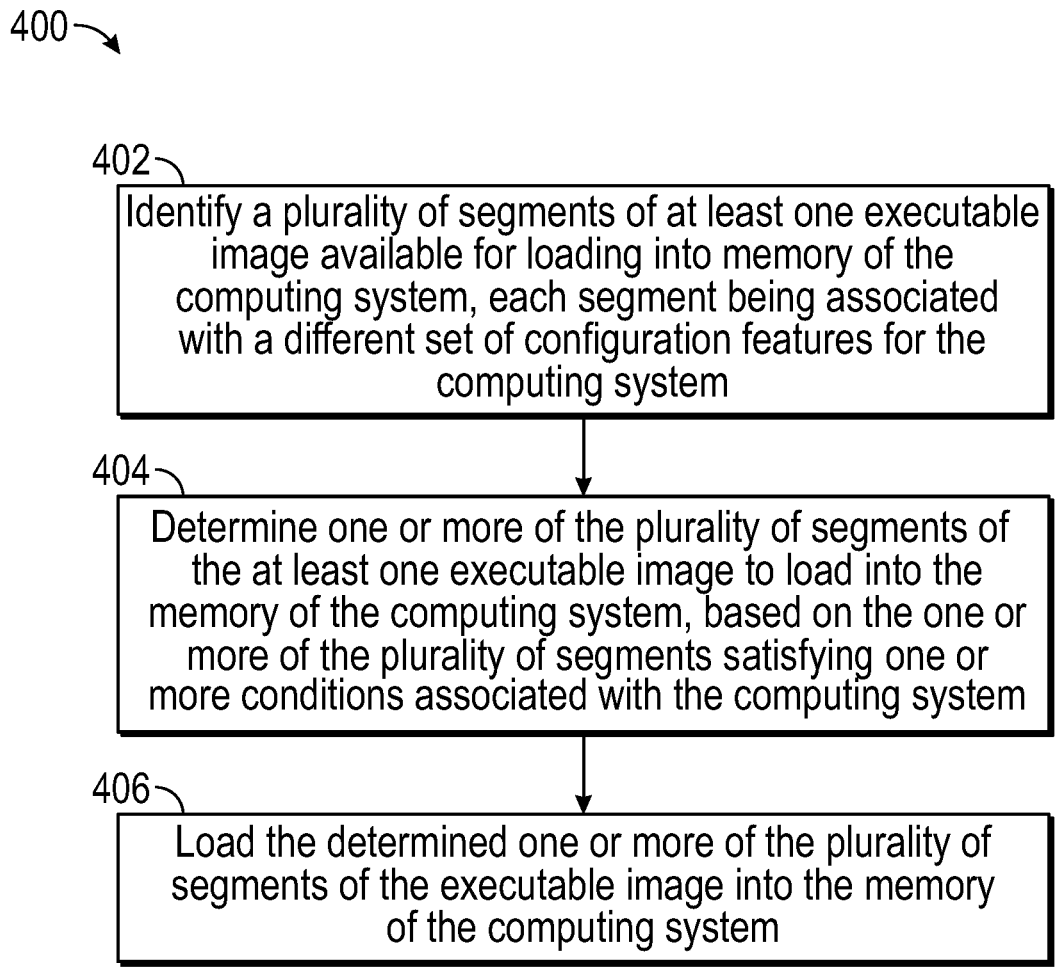
FIG. 4 illustrates exemplary operations for loading a firmware image for a computing system, in accordance with certain aspects of the present disclosure.

FIG. 4 illustrates exemplary operations 400 for loading a firmware image for a computing system, such as SoC 100. In certain aspects, operations 400 may be performed by an application processor, such as CPUSS 105.

Operations 400 may enter at 402, where the application processor identifies a plurality of segments of at least one executable image (or firmware image) available for loading into memory of the computing system. Each segment is associated with a different set of one or more configuration features for the computing system. In some aspects, each segment may be associated with a different set of one or more configuration features. At 404, the application processor determines a first one or more of the plurality of segments of the at least one executable image to load into the memory of the computing system, based on the first one or more of the plurality of segments satisfying one or more conditions associated with the computing system. At 406, the application processor loads the first one or more of the plurality of segments of the executable image into the memory of the computing system. In some aspects, the application processor may determine a second one or more of the plurality of segments to make available for memory re-allocation (e.g., for other purposes in the computing system) based on the second one or more of the plurality of segments not satisfying the one or more conditions. For example, in one aspect, the second one or more of the plurality of segments may be used for heap aggregation.

In certain aspects, the one or more conditions used to determine which of the plurality of segments to load into memory of the computing system may be based on a "feature fuse map" configured for the computing system. For example, during a design phase, a software developer may write code, such that different configuration features of a firmware image are organized (e.g., located) into different sections (or portions or segments) of memory. Similarly, during the design phase, the software developer may define a "feature fuse map," which specifies which configuration features of a firmware image are enabled for a given computing system. For example, assuming a firmware image is configured with three configuration features (Feature 1, Feature 2, Feature 3), the "feature fuse map" may indicate that Feature 1 is enabled for the computing system, Feature 2 is disabled for the computing system, and Feature 3 is enabled for the computing system. In some aspects, the "feature fuse map" may further indicate, for each feature, the segment of the image that contains the feature.

The "feature fuse map" (also referred to herein as mapping information") may indicate (i) the set of configuration features that can be enabled for the computing system and (ii) for each configuration feature, the particular segment of the plurality of segments that includes the configuration feature. In one aspect, the "feature fuse map" may be software. In this aspect, the application processor may obtain the "feature fuse map" from a storage location (e.g., by reading the "feature fuse map" from primary/secondary storage). In one aspect, the "feature fuse map" may be hardware, such as a fuse programmable read-only memory (PROM). In this aspect, the "feature fuse map" may be programmed in the SoC manufacturing process and/or be configured by the OEM. In some aspects, the determination at 404 that a segment satisfies the one or more conditions may include a determination that the segment includes at least one of the set of configuration features indicated in the mapping information ("feature fuse map").

In some aspects, the application processor may also perform a validation check for each of the plurality of segments that are loaded into the memory of the computing system, based on the mapping information. For example, each code segment associated with a given feature can be designed to evaluate the mapping information to verify that the computing system is allowed to use the configuration feature prior to the configuration feature being used by the computing system. If the mapping information indicates that the segment is valid, the configuration feature for that segment can be used. On the other hand, if the mapping information indicates that the segment is invalid, the configuration feature for that segment may not be used.

FIG. 5 illustrates an example "feature fuse map" 500 for an executable image, according to certain aspects presented herein. The "feature fuse map" 500 can be hardware-based (e.g., a fuse PROM) or software-based (e.g., an architectural driven feature specification). In this example, the "feature fuse map" uses eight fields, with each field corresponding to a different configuration feature for a computing system, to indicate which configuration features are enabled/disabled for the computing system. Note that although each field is shown as including a single bit, one or more bits can be used to indicate which features are enabled/disabled.

Here, the "feature fuse map" 500 indicates that that feature #1, feature #2, and feature 3 are enabled for this computing system, and that feature #4, feature #5, feature #6, feature #7, and feature #8 are disabled for this computing system. The configuration features may be associated with different capabilities of the computing system, including, for example, virtualization of different devices, tiny modem use case, etc. Here, for example, enabled feature #1 may correspond to system memory management unit (SMMU) virtualization, enabled feature #2 may correspond to virtualization of a camera device, and enabled feature #3 may correspond to 5G modem support. In addition to indicating which features are enabled/disabled, the "feature fuse map" 500 may indicate which segments of the firmware image (and/or which firmware image) each feature is located in. Here, for example, the "feature fuse map" 500 indicates that enabled feature #1 and enabled feature #3 are located in executable and link format (elf) 1 and that enabled feature #2 is located in elf2, where each elf corresponds to a different segment of the image.

Using the "feature fuse map" and segment information, the application processor can determine the relevant segments for a computing system (e.g., the segments that contain features which are enabled for the computing system) and load the relevant segments when loading a given image, as opposed to loading all of the segments of the image regardless of whether the segments include features that are enabled or disabled for the computing system. In some aspects, the memory of an image may be organized in order to allow for optimized loading of segments using the techniques presented herein. For example, during the design/compile phase, common (or critical) sections of code associated with all features within an image may be located in a common region of memory and the code sections for different features may be located in different regions of memory.

FIG. 6 illustrates an example memory map 600 for an executable image, according to certain aspects presented herein. As shown, the memory map 600 includes a common section of code (e.g., .txt_common) which is associated with all features (e.g., features 1 to N) of this image located at address 0x10000. Additionally, the common code associated with each respective feature is located at a different memory address. For example, the common code associated with feature 1 (e.g., .txt_feature 1) is located at address 0x20000, the common code associated with feature 2 (e.g., .txt_feature2) is located at address 0x30000, and so on. Similarly, the data that is associated with all features of this image (e.g., .data_common) is located at address 0xA0000, the data associated with feature 1 (e.g., .data_feature1) is located at address 0xB0000, the data associated with feature 2 (e.g., .data_feature2) is located at address 0xC0000, and so on. Organizing the memory of an image in this manner enables different features to be categorized into different segments, which in turns allows the application processor to load relevant segments of an image for a computing system into memory (e.g., DDR), as opposed to all segments of an image.

Figure 7:
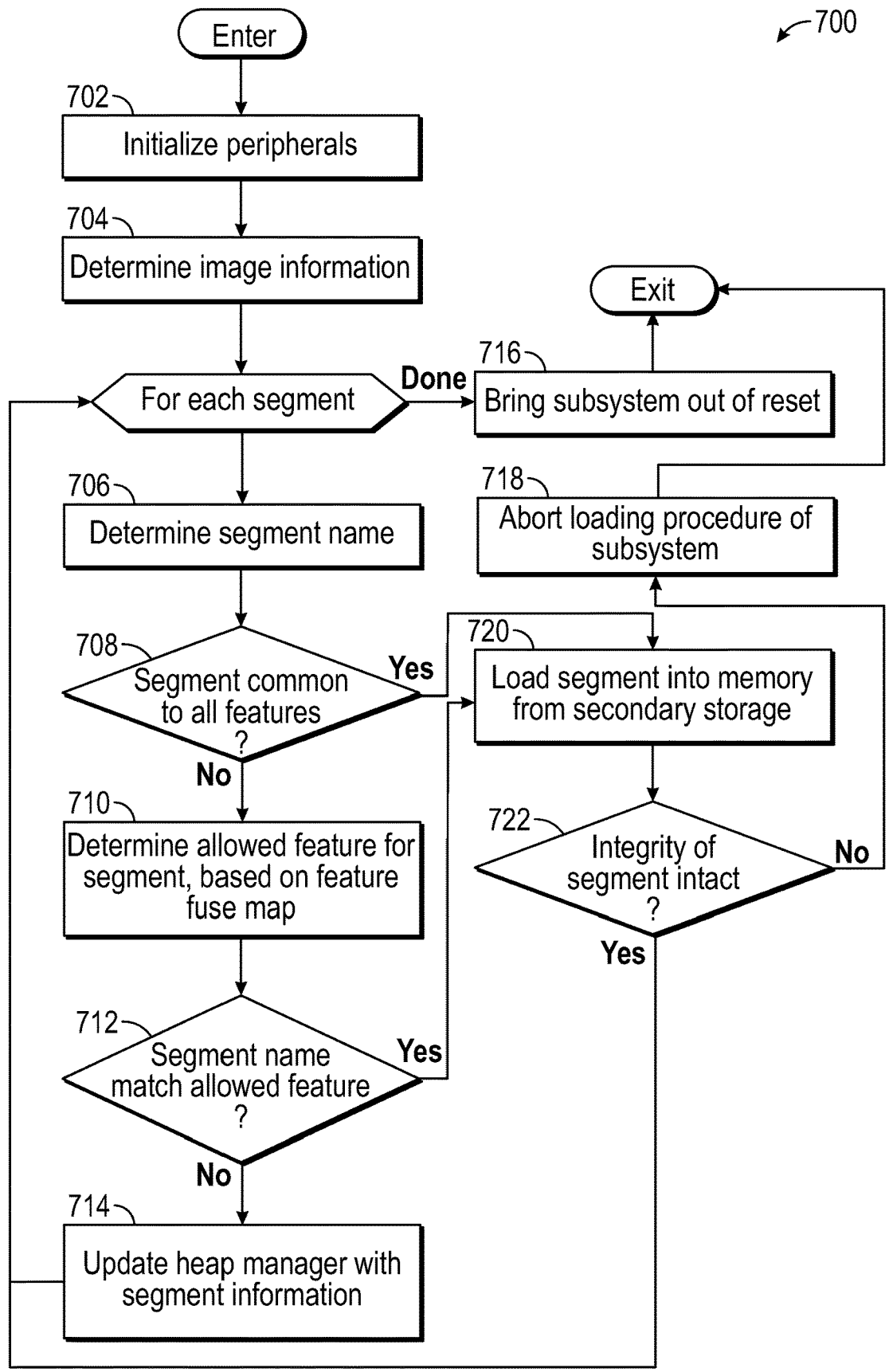
FIG. 7 is a flowchart of a method for bringing a subsystem of a computing system out of reset, in accordance with certain aspects of the present disclosure.

FIG. 7 is a flowchart of a method 700 for bringing a subsystem of a computing system, such as SoC 100, out of reset. In certain aspects, method 700 may be performed by an application processor, such as CPUS S 105. In some aspects, the method 700 may be performed for each subsystem of a computing system, e.g. in order to boot the computing system.

Method 700 may enter at 702, where the application processor initializes one or more peripherals used for bringing the computing system out of reset. Examples of such peripherals can include a storage controller (e.g., storage controller 180, such as a flash controller), memory (e.g., DRAM 190), a cryptographic engine (e.g., crypto engine 140), etc. At 704, the application processor determines (e.g., retrieves) information associated with an image. For example, the application processor may trigger the storage controller to retrieve the image information from secondary storage (e.g., flash storage). In one aspect, the image information may include the memory map for the image (e.g., memory map 600), segment information (e.g., segment start address, segment size, segment name, etc.) for each segment of the image, etc.

During the loading procedure, the application processor may determine, for each segment of the image, whether the segment includes at least one feature that is relevant to the computing system (e.g., enabled for the computing system). Based on the determination, the application processor may load the segment (e.g., if the segment includes a feature that is relevant) or refrain from loading the segment (e.g., if the segment includes a feature that is not relevant).

As shown, for each segment, the application processor determines a name of the segment (706) and determines, based in part on the segment name, if the segment is common to all features (708). In one aspect, the application processor can determine whether the segment is common to all features, based in part on the memory map for the image. Using the memory map 600 as a reference example, the application processor may determine whether the segment includes a common section of memory (e.g., .txt_common, .data_common, etc.) used for all configuration features within the executable image. If the segment is common to all features (e.g., the segment includes .txt_common or .data_common), then the application processor loads the segment into memory from secondary storage (720). At 722, the application processor determines if the integrity of the segment is intact (e.g., determining whether the segment has passed authentication and an integrity check). In one aspect, the application processor can perform the integrity check by determining if the hash for the segment of the firmware image matches the corresponding hash for the firmware image. If the segment fails the integrity check (e.g., the hash does not match), then the application processor aborts the loading procedure of the subsystem (718) and the method 700 exits. If the segment passes the integrity check (e.g., the hash does match), then the application processor proceeds to the next segment.

If, at 708, the application processor determines that the segment is not common to all features (e.g., the segment does not include a portion of memory common to all features, such as .txt_common, data_common, etc.), then the application processor determines which feature(s) is allowed for the segment, based on the feature fuse map (710). For example, the application processor can evaluate the feature fuse map to determine which feature(s) is associated with the given segment (e.g., feature fuse map 500 may indicate that feature #2 is allowed for the segment).

At 712, the application processor determines if the segment name of the given segment corresponds to the segment name in the feature fuse map that is associated with the allowed feature. For example, the application processor can check whether the segment name of the segment that includes the feature in the memory map (e.g., segment name associated with segment start address 0x30000 for .txt_feature2) corresponds to the segment name in the feature fuse map for that feature (e.g., segment name for feature #2 in feature fuse map 500).

If the segment name matches the allowed feature, then the application processor proceeds to 720. If the segment name does not match the allowed feature, then application processor updates a heap manager with the segment information of the given segment (714). For example, the application processor may indicate that the memory associated with the particular segment can be reused for heap aggregation. Note, however, that is merely an example and that the memory associated with the particular segment can be reused or reallocated for other purposes in the computing system. Once updated, the application processor proceeds to the next segment. Once all segments have been evaluated, the application processor brings the subsystem out of reset (716), and the method 700 exits.

Figure 8:
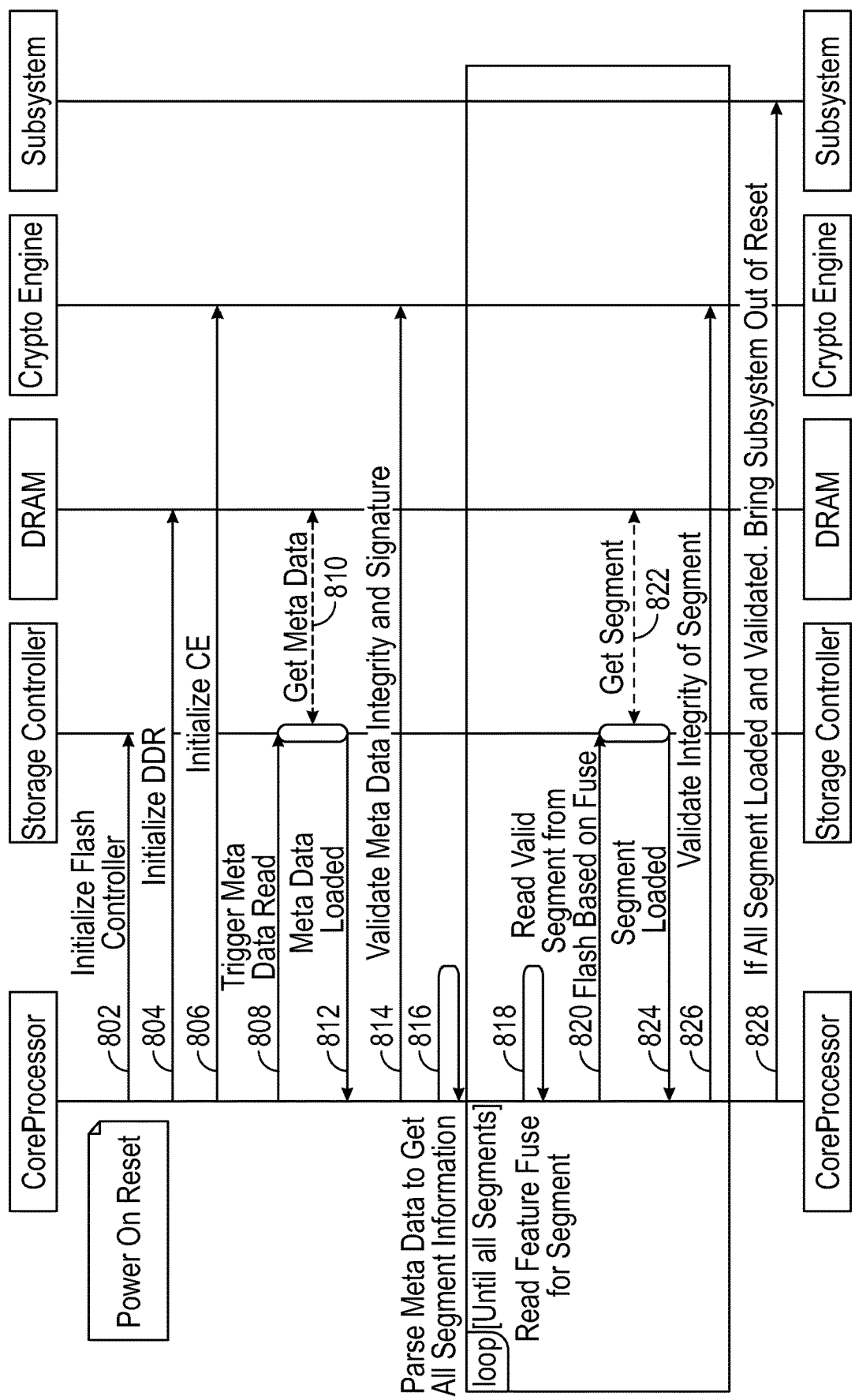
FIG. 8 illustrates an optimized boot flow for bringing a system out of reset, in accordance with certain aspects of the present disclosure.

FIG. 8 illustrates a reference example of an optimized boot flow that can be used by the application processor to bring a system out of reset, in accordance with certain aspects of the present disclosure. Here, after initializing a set of peripheral components (e.g., storage controller 180, DRAM 190, and crypto engine (CE) 140) at 802, 804, and 806, the application processor retrieves image metadata from DRAM 190. For example, the application processor can trigger the storage controller, at 808, to read image metadata from DRAM 190. The storage controller retrieves the image metadata (810), loads the image metadata in DRAM, and sends acknowledgement to the application processor (812). The application processor validates the integrity and signature of the image metadata (814). At 816, the application processor parses the image metadata to obtain segment information for each segment of the image.

The application processor then performs an image loading procedure, for each segment, based on the obtained segment information. As shown, at 818, the application processor reads the feature fuse for the segment. As noted, the application processor can obtain the feature fuse from secondary storage (e.g., in the case of a "software" feature fuse) or read it from hardware (e.g., the feature fuse may be a fuse PROM). If the application processor determines, based on the feature fuse, that the feature is enabled, then the application processor sends an indication of the enabled segment to the storage controller 180 (820), triggering the storage controller 180 to retrieve the segment from secondary storage and load it to DRAM 190 (822). At 824, the storage controller 180 sends an acknowledgement (that the segment has been loaded to DRAM 190) to application processor (824). The application processor validates the integrity of the segment, via the crypto engine 140 (826). The application processor may repeat at least step 818 for each segment within the image, and repeat steps 818, 820, 822, 824, and 826 for each valid segment within the image. Once all segments have been loaded and validated, the application processor can bring the subsystem out of reset (828).

Figure 9:
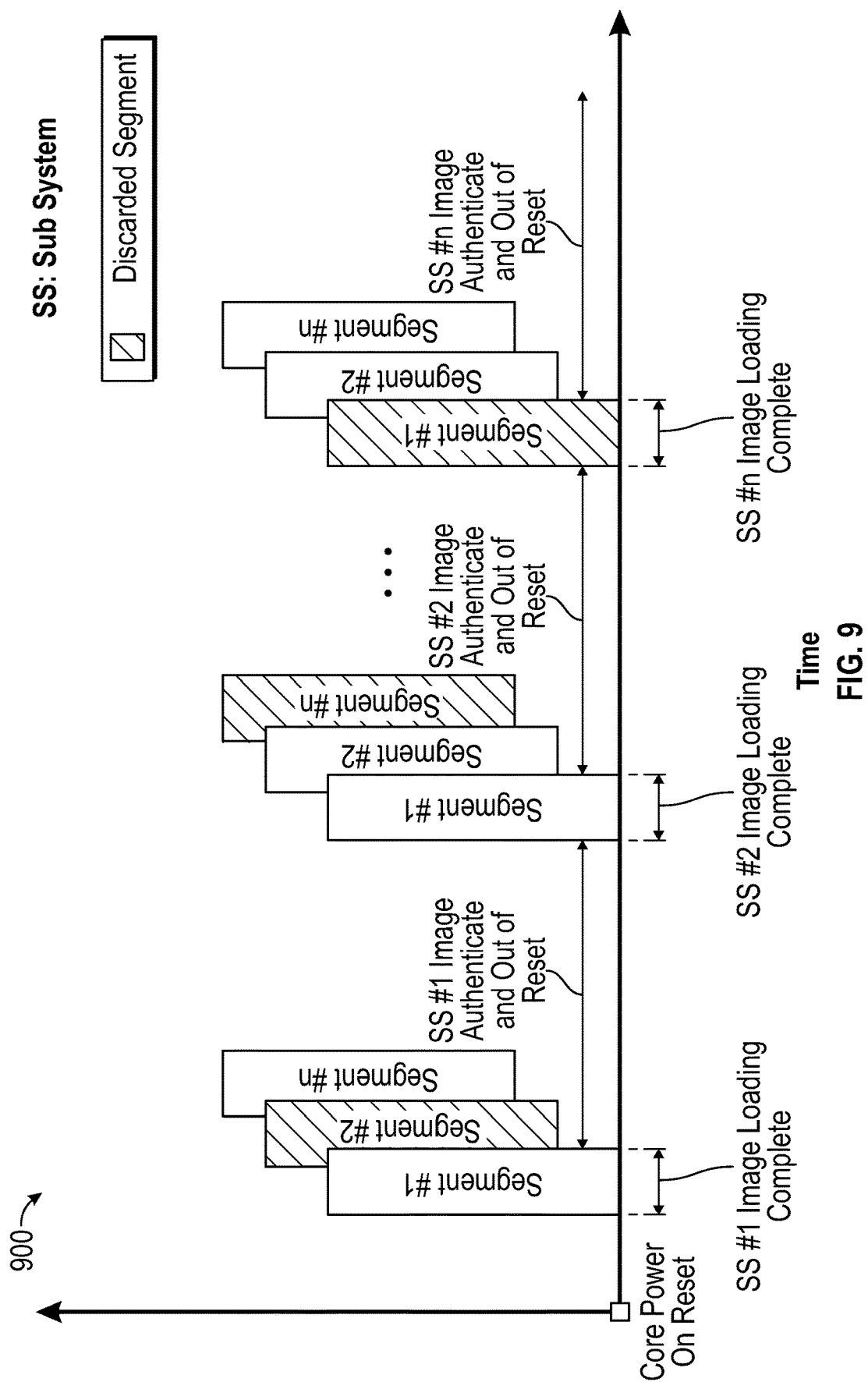
FIG. 9 depicts an example timeline for bringing a system out of reset using an optimized boot flow, in accordance with certain aspects of the present disclosure.

The optimized boot flow described herein can significantly decrease the amount of time associated with bringing a computing system out of reset, e.g., relative to conventional boot techniques. As shown in FIG. 9, for example, the application processor using the techniques presented herein can refrain from loading segment #2 of the image for SS #1, refrain from loading segment #n of the image for SS #2, and refrain from loading segment #1 of the image for SS #n. Thus, the total amount of time associated with bringing a computing system out of reset using the techniques presented herein may be approximately equal to the total amount of time for $SS_1$(max segments−discarded segments)+$SS_2$(max segments−discarded segments)++$SS_n$(max segments−discarded segments).

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

These apparatus and methods described in the detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

What is claimed is:

1. A computer-implemented method for loading an executable image for a computing system, the computer-implemented method comprising:
   identifying a plurality of segments of at least one executable image available for loading into memory of the computing system, each segment being associated with one or more configuration features for the computing system;
   determining mapping information indicating (i) a set of configuration features that can be enabled for the computing system and (ii) for each configuration feature in the set of configuration features, a segment of the plurality of segments that includes the configuration feature;
   determining a first one or more of the plurality of segments of the at least one executable image to load into the memory of the computing system, based at least in part on the mapping information and on the first one or more of the plurality of segments satisfying one or more conditions associated with the computing system; and
   loading the first one or more of the plurality of segments of the executable image into the memory of the computing system.

2. The computer-implemented method of claim 1, wherein the mapping information is software-based and is obtained from a storage location associated with the computing system.

3. The computer-implemented method of claim 1, wherein the mapping information is hardware-based and is pre-configured for the computing system.

4. The computer-implemented method of claim 1, wherein the one or more conditions comprises a determination that a segment includes at least one of the set of configuration features indicated in the mapping information.

5. The computer-implemented method of claim 1, further comprising, after loading the first one or more of the plurality of segments, verifying that the computing system is allowed to use the one or more configuration features associated with each of the first one or more of the plurality of segments, based on the mapping information.

6. The computer-implemented method of claim 1, wherein a subset of the plurality of segments are loaded into the memory of the computing system.

7. The computer-implemented method of claim 1, wherein each segment is associated with a different set of one or more configuration features.

8. The computer-implemented method of claim 1, further comprising determining a second one or more of the plurality of segments to make available for memory re-allocation, based on the second one or more of the plurality of segments not satisfying the one or more conditions.

9. The computer-implemented method of claim 8, wherein the second one or more of the plurality of segments are made available for heap aggregation.

10. A system-on-chip (SoC) comprising:
    an interface to a memory; and
    at least one processor coupled to the memory and configured to:
      identify a plurality of segments of at least one executable image available for loading into the memory, each segment being associated with one or more configuration features for the SoC;
      determine mapping information indicating (i) a set of configuration features that can be enabled for the SoC and (ii) for each configuration feature in the set of configuration features, a segment of the plurality of segments that includes the configuration feature;
      determine a first one or more of the plurality of segments of the at least one executable image to load into the memory, based at least in part on the mapping information and on the first one or more of the plurality of segments satisfying one or more conditions associated with the SoC; and
      load the first one or more of the plurality of segments of the executable image into the memory.

11. The SoC of claim 10, wherein the mapping information is hardware-based or software-based.

12. The SoC of claim 10, wherein the one or more conditions comprises a determination that a segment includes at least one of the set of configuration features indicated in the mapping information.

13. The SoC of claim 10, wherein the at least one processor is further configured to, after loading the first one or more of the plurality of segments, verify that the SoC is allowed to use the one or more configuration features associated with each of the first one or more of the plurality of segments, based on the mapping information.

14. The SoC of claim 10, wherein a subset of the plurality of segments are loaded into the memory.

15. The SoC of claim 10, wherein each segment is associated with a different set of one or more configuration features.

16. The SoC of claim 10, wherein the at least one processor is further configured to determine a second one or more of the plurality of segments to make available for memory re-allocation, based on the second one or more of the plurality of segments not satisfying the one or more conditions.

17. The SoC of claim 16, wherein the second one or more of the plurality of segments are made available for heap aggregation.

18. A non-transitory computer readable medium having instructions stored thereon that, when executed by a processor, cause the processor to perform a method of loading an executable image for a computing system, the method comprising:
- identifying a plurality of segments of at least one executable image available for loading into memory of the computing system, each segment being associated with one or more configuration features for the computing system;
- determining a first one or more of the plurality of segments of the at least one executable image to load into the memory of the computing system, based on the first one or more of the plurality of segments satisfying one or more conditions associated with the computing system;
- loading the first one or more of the plurality of segments of the executable image into the memory of the computing system; and
- determining a second one or more of the plurality of segments to make available for memory re-allocation, based on the second one or more of the plurality of segments not satisfying the one or more conditions.

19. The non-transitory computer readable medium of claim 18, wherein the second one or more of the plurality of segments are made available for heap aggregation.

20. The non-transitory computer readable medium of claim 18, wherein:
- the one or more conditions comprises a determination that a segment includes at least one configuration feature indicated in mapping information, which indicates a set of configuration features that can be enabled for the computing system; and
- the mapping information is software-based or hardware-based.

* * * * *